United States Patent [19]

Grinshpun et al.

[11] Patent Number: 5,654,345
[45] Date of Patent: Aug. 5, 1997

[54] IN SITU BLOWN FOAMS

[75] Inventors: Vyacheslav S. Grinshpun, Granville; Byron Jeffrey Hulls, Newark, both of Ohio

[73] Assignee: Owens-Corning Fiberglas Technology, Inc., Summit, Ill.

[21] Appl. No.: 501,691

[22] Filed: Jul. 12, 1995

[51] Int. Cl.[6] ................................ C08J 9/00
[52] U.S. Cl. .................... 521/94; 521/128; 521/158; 521/163; 521/164; 521/181
[58] Field of Search ................ 521/94, 128, 158, 521/163, 164, 181

[56] References Cited

U.S. PATENT DOCUMENTS

| | | |
|---|---|---|
| 3,770,671 | 11/1973 | McFarling . |
| 3,872,034 | 3/1975 | Dickert . |
| 3,948,824 | 4/1976 | Robins . |
| 4,490,490 | 12/1984 | Patton, Jr. et al. . |
| 4,910,231 | 3/1990 | Pham et al. . |
| 4,916,168 | 4/1990 | Pham et al. . |
| 5,114,989 | 5/1992 | Elwell et al. . |
| 5,130,346 | 7/1992 | Ishii et al. . |
| 5,143,941 | 9/1992 | Rossio et al. . |
| 5,166,183 | 11/1992 | Franyutti et al. . |
| 5,167,884 | 12/1992 | Rossio et al. . |
| 5,171,759 | 12/1992 | Hager . |
| 5,177,119 | 1/1993 | Motte . |
| 5,189,068 | 2/1993 | Boehme et al. . |
| 5,252,625 | 10/1993 | McLaughlin et al. . |
| 5,296,518 | 3/1994 | Grasel et al. .................... 521/176 |
| 5,328,938 | 7/1994 | Wishneski et al. ............ 521/78 |
| 5,432,207 | 7/1995 | Rader ............................ 521/128 |

*Primary Examiner*—Morton Foelak
*Attorney, Agent, or Firm*—C. Michael Gegenheimer; Linda S. Evans

[57] ABSTRACT

The invention forms in situ carbon dioxide blown closed cell insulating foams in which blowing is achieved by the evolution of carbon dioxide resulting from partial hydrolysis of polyisocyanate (methyl diphenyl diisocyanate) by water in the resole. The invention uses no additional blowing agent. The reaction is fast and the resulting product has small, closed cells that exhibit long term thermal performance.

20 Claims, No Drawings

IN SITU BLOWN FOAMS

TECHNICAL FIELD

This invention relates to the low density microcellular, rigid foams made from low water content or waterless resins such as phenolic resin (resole or novalac). We make the in situ blown, closed cell foams without an external blowing agent.

BACKGROUND ART

Insulating synthetic foams have found various application in contemporary society. One of the most voluminous applications of these foams is in the construction field, as insulators for walls, roofs, basements, etc. More Specialized applications for these foams include appliances (refrigeration), pipes, ducting, auto, aerospace and marine industries.

Despite expanding applications and ever increasing production of insulating foams, their thermal insulating properties especially their long term insulating properties did not improve in the last decade, but have somewhat suffered due to the switch to environmentally friendly blowing agents. Improvements in the insulating properties of these foams, especially their low density variety will save a lot of energy, reduce the consumption of fossil fuels and improve the environment due to the reduction in greenhouse gases formed by the combustion of fossil fuels.

DISCLOSURE OF INVENTION

This invention forms in situ carbon dioxide blown closed cell insulating foams in which blowing is achieved by the evolution of carbon dioxide resulting from partial hydrolysis of isocyanates such as methyl diphenyl diisocyanate (MDI) by water in the resole. The invention uses no additional blowing agent. The reaction is fast and the resulting product has small, closed cells that exhibit long term thermal performance.

Preferably, the composition comprises the following ingredients:

(1) Low water content resole, which is the reaction product of formaldehyde and phenol;

(2) Surface active agent, such as ethylene oxide-propylene oxide block copolymer;

(3) Mixture of isomers of methyl diphenyl diisocyanate (MDI); and (4) Catalysts, such as stannous octoate.

The process for producing the closed cell insulating foam of the invention comprises mixing the resole, the surface active agent and the MDI at room temperature. Next, the catalyst is added and stirred vigorously. The prefoam thus formed is placed in a release paper lined steel closed mold preheated at 60° C., and the mold is maintained at this temperature for one minute. Finally, the foam bun thus produced is removed from the mold and allowed to cure at room temperature.

BEST MODE OF CARRYING OUT INVENTION

When producing a phenolic resin, we use well known methods having phenol:formaldehyde ratios of 1.1:1 to 1:3.0. We then dewater the reaction product to 0.1%–7.5% water and to viscosity of liquid resin from 2,000–20,000 cps at 40° C. Next, we add a surfactant in an amount at 2% to 7% by mass of resin solids.

We then combine this with MDI in a mol ratio of 0.45:1 to 1.35:1 with respect to the average number of methylol groups of phenolic, as measured by NMR. This is reacted by addition of 0.1% to 1.0% by mass of catalyst. The catalyst is one or a mixture of dibutyltin dilaurate, N,N,N',N'-tetramethyl-1,3-butanediamine, stannous octoate acetate or triethylene diamine. After vigorous mixing for 15 seconds, the mixture is transferred to a closed mold at 25°–90° C. After 0.5 to 5 minutes of cure time, the product is removed from the mold.

In the case of waterless phenolics, we obtain only a microcellular structure since relatively small quantities of water are evolved from the phenolic polycondensation reaction which partially hydrolize the MDI and lead to $CO_2$ evolution. In the case of water containing phenolic, the initial water promotes the formation of larger cells ($\approx 80$ μk) and the water of polycondensation gives rise to microcells (<1 μk) in the struts of the cellular structure.

The following formula represents the resol:

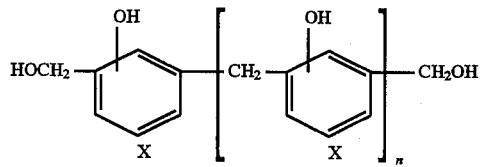

where X is H or —$CH_2OH$ and n=0, 1, 2, 3, or higher.

When the phenol is used in molar excess, the novalac product has little or no hydroxymethyl substitution and has the following formula:

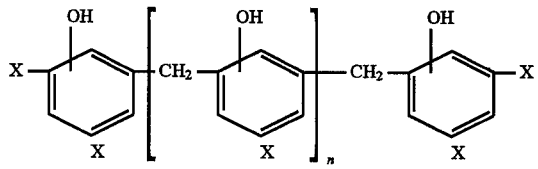

where X is hydrogen and n=0, 1, 2, 3, or higher.

The —NCO containing compounds include the following: 2,4-tolylene diisocyanate; 2,6-tolylene diisocyanate; p-phenylene diisocyanate; polymethylene polyphenylisocyanate; diphenyl-methane diisocyanate; m-phenylene diisocyanate; hexamethylene diisocyanate; butylene-1,4-diisocyanate; octamethylene diisocyanate; 3,3'-dimethoxy 4,4-biphenylene diisocyanate; 1,18-octadecamethylene diisocyanate; polymethylene diisocyanate; benzene triisocyanate; naphthylene-2,4-diisocyanate, 3,3'-dimethyl-4,4'- biphenylene diisocyanate; 4,4'-diisocyanate; diphenylether; naphthylene-1,5-diisocyanate;diisocyanate-dicyclohexyl-methane; p-xylylene diisocyanate; xylylene diisocyanate; hydrogenareal dipehnylene diisocyanate; hydrogenated diphenyl methane diisocyanate; toluene-2,4,6-triisocyanate; 3-methyl-4,6,4'-triisocyanate diphenylmethane; 2,4,4'-triisocyanate diphenyimethane; 2,4,4'-triisocyanate diphenyl; 2,4,4'-triisocyanate diphenyl ether; long chain hydrocarbons; and substituted hydrocarbons terminated with —NCO radicals and mixtures thereof.

Other catalysts used for polyurethane formation are those known in the art and consist of tertiary amines, metal salts, or mixtures thereof. Examples of such suitable catalytic compounds are triethylamine, dimethylaminoethanol, N,N, N',N'-tetraethylethylenediamine, N,N,N',N'-tetramethyl-1, 3-butanediamine, bis(-dimethylaminoethyl)ether, 1,4-diazol [2.2.2]-bicyclooctane, N-methyl- or ethylmorpholine, stannous oleate, stannous 2-ethylhexanoate, dibutyltin dilaurate, dibutyl-tin dilauryl mercaptide, dibutyltin diacetate, lead naphthenate, zinc stearate, or mixtures thereof.

The preferred catalysts for our invention are non-acidic organotin catalysts. The particular organic structure for the organotin catalyst is not critical; it is only necessary that tin be present since the tin is the basic catalytic agent. Examples of suitable organotin catalysts are stannous oxalate, stannous oleate, stannous chloride, stannous formate, etc. Any organotin compound which is not volatile or subject to decomposition at the initial reaction temperature (which is not higher than 90° F.) and which is soluble in the reaction mixture will suffice. Preferred catalysts are reaction products of stannous oxide (SnO) or dibutyltin oxide with a carboxylic acid having 1 to 20 carbon atoms. A preferred catalyst is stannous octoate (stannous 2-ethylhexoate) $Sn(C_8H_{12}O_2)_2$— which is a reaction product of stannous oxide and 2-ethylhexoic acid. Examples of catalysts derived from dibutyltin oxide are dibutyltin diacetate, dibutyltin di(2, ethylhexoate) and dibutyltin dilaurate.

Since low density foams are desired, we employ a surface active agent of an alkylene glycol of 2 to 10 carbon atoms such as ethylene glycol, butylene glycol and propylene glycol or an ether of an alkylene glycol of 2 to 10 carbon atoms such as diethylene glycol and dipropylene glycol, or mixture thereof. The preferred surface active agent is a alkylene glycol-polyoxyalkylene block copolymer.

The key to this invention is a waterless or low water phenolic resin. The resulting foam has a particular microcellular structure which provides high strength and interrupts crack migration.

The following examples further demonstrate our invention.

EXAMPLE 1

Preparation of Resol

We prepared a resol resin by mixing 52% formaldehyde and 99% phenol to produce a formaldehyde: phenol ratio of 2.3:1. This blend was basicified to a pH of 8.6 by the addition of a 50% caustic solution and the temperature was elevated to start the reaction. The reaction was cooled and then neutralized with 50% aqueous aromatic sulphonic acid. We then added 8.3 parts of urea per 100 parts of resol.

Next, we then stripped water from the resulting mixture using a thin film evaporator. We reduced the water content from 31% to 5.4%. The final viscosity of the resin was 5,000 cps measured at 40° C.

This resol was analyzed by NMR and found to have 1.57 methylol groups per phenol.

EXAMPLE 2

Preparation of Foam

We used the resol of Example I to produce a low density closed cell structured foam having a small cell size and a rapid demolding time. We used the following ingredients and amounts.

| Ingredients | Parts per 100 Parts |
|---|---|
| Resol | 28.8 |
| Surface Active Agent | 4.8 |
| ISO #17 (BASF) | 66.1 |
| a mixture of isomers of methyl diphenyl diisocyanate | |
| Dabco T9 (Air Products) | 0.3 |
| a stannous octoate catalyst | |

The surface active agent used was an ethylene oxide propylene oxide block copolymer with a molecular weight greater than 5,000.

No blowing agent was added to the mixture. The only blowing agent present was the 5.4% water from the resol reaction.

The resulting foam has the following advantages: no blowing agent used (environmentally friendly); closed cell structure-long term thermal performance; economical—due to use of resol chemistry; fast urethane-type reaction; small cell size –80/μk; microcellular structure in the struts; superior physicals at low density; and low flammability.

We claim:

1. A low density, microcellular, rigid resole foam comprising a reaction product of a polyisocyanate and a resole in the presence of a catalyst and a surfactant without an external blowing agent;

wherein the resole is a reaction product of phenol and formaldehyde having a phenol:formaldehyde ratio ranging from 1.1:1 to 1:3.0 wherein the resole reaction product is dewatered to a water content ranging from 0.1 to 7.5 weight percent, based on the total weight of the resole reaction product, and has a viscosity of 2,000 to 20,000 cps at 40° C.; and the resole foam comprises cells having an average cell size equal to or less than 80 μk.

2. A resole foam according to claim 1 wherein the foam forms in situ by evolving carbon dioxide by partial hydrolysis of the polyisocyanate by the water of the resole reaction product.

3. A resole foam according to claim 1 wherein the foam further comprises struts having an average size equal to or less than 1 μk.

4. A resole foam according to claim 1 wherein the polyisocyanate is methyl diphenyl diisocyanate.

5. A resole foam according to claim 1 wherein the surfactant is an alkylene glycol-polyoxyalkylene block copolymer.

6. A resole foam according to claim 1 wherein the surfactant is ethylene oxide-propylene oxide block copolymer.

7. A resole foam according to claim 1 wherein the catalyst is an organotin catalyst.

8. A resole foam according to claim 1 wherein the catalyst is stannous octoate.

9. A process for producing a low density, microcellular, rigid resole foam comprising the steps of:

providing a foaming composition of
   (a) a phenol formaldehyde resole reaction product having a water content of from 0.1% to 7.5% by weight of the resole reaction product and a viscosity ranging from 2,000 to 20,000 cps at 40° C.;
   (b) a polyisocyanate;
   (c) a surfactant; and
   (d) a catalyst;

mixing the composition to initiate foaming and to produce a resole foam without an external blowing agent; and curing the resole foam to a density equal to or less than 1.5 pounds per cubic foot; wherein the resole foam comprises cells having an average cell size equal to or less than 80 μk.

10. A process according to claim 9 wherein the foam forms in situ by evolving carbon dioxide by partial hydrolysis of the polyisocyanate and the water of the resole reaction product.

11. A process according to claim 9 wherein the resole foam further comprises struts having an average size equal to or less than 1 μk.

12. A process according to claim 9 wherein the polyisocyanate is methyl diphenyl diisocyanate.

13. A process according to claim 9 wherein the surfactant is an alkylene glycol-polyoxyalkylene block copolymer.

14. A process according to claim 9 wherein the surfactant is ethylene oxide-propylene oxide block copolymer.

15. A process according to claim 9 wherein the catalyst is an organotin catalyst.

16. A process according to claim 9 wherein the catalyst is stannous octoate.

17. A process for producing a low density, microcellular, rigid resole foam comprising the steps of:

preparing a foaming composition from ingredients consisting essentially of:

(a) a phenol formaldehyde resole reaction product having a water content of from 0.1% to 7.5% by weight of the resole reaction product and a viscosity ranging from 2,000 to 20,000 cps at 40° C.;

(b) a polyisocyanate;

(c) a surfactant; and (d) a catalyst;

mixing the composition to initiate foaming and to produce a resole foam without an external blowing agent; and curing the resole foam to a density equal to or less than 1.5 pounds per cubic foot.

18. A process according to claim 17 wherein the resole foam comprises cells having an average cell size equal to or less than 80 μk.

19. A process according to claim 18 wherein the catalyst is an organolin catalyst.

20. A process according to claim 17 wherein the resole foam further comprises struts having an average size equal to or less than 1 μk.

* * * * *